(12) United States Patent
Inui et al.

(10) Patent No.: US 7,707,837 B2
(45) Date of Patent: May 4, 2010

(54) STEAM REFORMING SYSTEM

(75) Inventors: Taiji Inui, Tokyo (JP); Tsunehisa Kawaguchi, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 1116 days.

(21) Appl. No.: 11/028,006

(22) Filed: Jan. 4, 2005

(65) Prior Publication Data
US 2005/0176831 A1 Aug. 11, 2005

(30) Foreign Application Priority Data
Jan. 9, 2004 (JP) ............................. 2004-003581

(51) Int. Cl.
F02C 6/18 (2006.01)
(52) U.S. Cl. ..................... 60/780; 60/39.182
(58) Field of Classification Search ............ 60/772, 60/784, 780, 39.182, 39.461
See application file for complete search history.

(56) References Cited

U.S. PATENT DOCUMENTS

| 5,221,586 A * | 6/1993 | Morimoto et al. ............. 429/20 |
| 5,413,879 A * | 5/1995 | Domeracki et al. ........... 429/30 |
| 5,581,997 A * | 12/1996 | Janes ....................... 60/39.12 |
| 6,048,472 A * | 4/2000 | Nataraj et al. ............... 252/373 |
| 6,256,978 B1 * | 7/2001 | Gericke et al. ........... 60/39.182 |
| 2002/0177629 A1 * | 11/2002 | O'Beck et al. .............. 518/703 |
| 2006/0057060 A1 * | 3/2006 | Sun et al. .................... 423/651 |

FOREIGN PATENT DOCUMENTS

| JP | 5-332167 A | 12/1993 |
| JP | 6-207531 | 7/1994 |

* cited by examiner

*Primary Examiner*—Michael Cuff
*Assistant Examiner*—Andrew Nguyen
(74) *Attorney, Agent, or Firm*—Mattingly & Malur, P.C.

(57) ABSTRACT

A steam reforming system with high thermal efficiency, which can compensate for a reduction in the amount of steam generated in a reformer without increasing the reformer size and without limiting the degree of freedom in layout of the reformer and a gas turbine. A gas turbine and a heat recovery exchanger are additionally installed such that the gas turbine generates electric power, and flue gases of the gas turbine are employed to preheat feedstocks supplied to the reformer and to generate steam used for the pre-reforming stage. The heat recovery exchanger is disposed in a downstream channel for the flue gases (at 500-600° C.) of the gas turbine to perform heat exchange between the high-temperature flue gases of the gas turbine and the feedstocks supplied to the reformer, thereby increasing the temperature of the feedstocks to a level suitable for vaporization and desulfurization, and to a level suitable for the pre-reforming stage in a pre-reformer. Generation and superheating of steam required for the pre-reforming stage are performed by the remaining heat of the flue gases of the gas turbine.

7 Claims, 4 Drawing Sheets

STEAM REFORMING SYSTEM

BACKGROUND OF THE INVENTION

1. Field of the Invention

The present invention relates to a steam reforming system utilizing flue gases of a gas turbine, and more particularly to a steam reforming system equipped with a pre-reformer, which is used for a plant producing hydrogen, ammonia, methanol, etc. by using hydrocarbons with carbon numbers of $C_2$ or more as feedstocks.

2. Description of the Related Art

A reformer is employed in production processes for hydrogen, ammonia, methanol, etc. to produce, from hydrocarbons supplied as feedstocks, synthesis gases that serve in turn as feedstocks for producing those products. The hydrocarbons supplied as feedstocks are pressurized to a level of required pressure, and then subjected to preheating and desulfurization. After being mixed with steam, the feedstocks are heated to about 500° C. through heat exchange with flue gases leaving the reformer, and are introduced to a heated pipe of the reformer which is filled with a steam reforming catalyst. The introduced feedstocks are exposed to the heat of combustion gases of the reformer and are converted to the synthetic gases. For example, when the feedstocks are reformed for conversion to the synthetic gases under pressurization at a pressure of about 20 atmospheres, the reforming temperature is not lower than 800° C. and therefore a large amount of fuel used for the heating is required.

As methods for saving fuel used for the heating, Patent Reference 1; JP,A 06-207531, for example, proposes a system (hereinafter referred to as a "steam reforming system utilizing flue gases of a gas turbine") in which a gas turbine is additionally installed in combination with a reformer to produce electric power, and high-temperature flue gases of the gas turbine are introduced as combustion air to the reformer. Another proposal is a system (hereinafter referred to as a "pre-reforming system") in which the fuel consumption in the reformer is reduced by installing a pre-reformer upstream of the reformer to convert heavy hydrocarbons in feedstocks to methane in advance, thereby increasing the temperature at a reformer inlet, which has hitherto been limited to a level not higher than about 500° C. for the purpose of preventing a trouble of carbon formation due to thermal cracking of the feedstocks at the reformer inlet, up to a level of 550-600° C. through heat exchange with flue gases of the reformer.

Also, in the steam reforming system of JP,A 06-207531, a part of the high-temperature flue gases of the additionally-installed gas turbine is directly introduced to a heating furnace via a flue gas channel, and a regular or emergency blower is installed to be ready for unexpected stop of the gas turbine so that air exiting the blower can be introduced to some midpoint of the exhaust gas channel.

Further, in the known pre-reforming system, the feedstocks must be desulfurized before being introduced to the pre-reformer, and a preheater furnace is installed to preheat the feedstocks up to the temperature required for desulfurization. The temperature of the feedstocks must be further increased to perform a pre-reforming stage, and the flue gases of the reformer are employed as a heat source for that purpose. More specifically, a heating coil is inserted in a reformer's convection section to heat the feedstocks up to the temperature required for the pre-reforming stage, and the preheated feedstocks are introduced to the pre-reformer.

SUMMARY OF THE INVENTION

With the technique disclosed in JP,A 06-207531, the effect of cutting the fuel consumption in the reformer is expected, but a problem of increasing the reformer size arises because the increased amount of the combustion flue gases of the reformer leads to a reduction in the average temperature of the combustion flue gases, thereby reducing the radiant heat absorption efficiency of the reformer. Further, since the flue gases of the gas turbine have high temperatures in the range of 500-600° C., a flue gas duct endurable against such a high temperatures level is required to introduce the high-temperature flue gases to the reformer. When trying to minimize the facility cost, therefore, the reformer and the gas turbine must be installed close to each other. In such a case, the degree of freedom in plant layout is limited.

In the pre-reforming system, a part of the waste heat of the reformer, which has been used to generate steam in the past, is recovered as heat for heating the feedstocks up to the temperature suitable for the pre-reforming stage, and the effect of saving the fuel consumption in the reformer, which is obtained with the use of the pre-reformer, leads to a reduction in thermal value of the flue gases of the reformer. Accordingly, there arises a problem that the amount of steam generated from the reformer is reduced.

It is an object of the present invention to provide a steam reforming system with high thermal efficiency, which can compensate for a reduction in the amount of steam generated in a reformer without increasing the reformer size and without limiting the degree of freedom in layout of the reformer and a gas turbine.

To achieve the above object, according to the present invention, a gas turbine and a heat recovery exchanger are additionally installed such that the gas turbine generates electric power, and flue gases of the gas turbine are employed to preheat feedstocks supplied to a reformer and to generate steam used for the pre-reforming stage. More practically, the heat recovery exchanger is disposed in a downstream channel for the flue gases (at 500-600° C.) of the gas turbine to perform heat exchange between the high-temperature flue gases of the gas turbine and the feedstocks supplied to the reformer, thereby increasing the temperature of the feedstocks to a level suitable for vaporization and desulfurization, and to a level suitable for the pre-reforming stage. Generation and superheating of steam required for the pre-reforming stage are performed by the remaining heat of the flue gases of the gas turbine.

According to the present invention, since the high-temperature flue gases of the gas turbine are not directly supplied to the reformer, the fuel consumption can be saved without reducing the radiant heat absorption efficiency of the reformer and without increasing the reformer size. Another advantage is that since there is no need of laying a flue gas duct subjected to high temperatures over a long distance, the gas turbine is not always required to be installed near the reformer and a high degree of freedom in planning of the plant layout is ensured.

Further, if the fuel consumption in the reformer is saved by installing only the pre-reformer, the amount of steam generated in a reformer's convection section is reduced. In contrast, the present invention is able to not only compensate for such a reduction in the amount of steam generated in the reformer's convection section, but also to supply the electric power required in the plant with the independent generation of electric power within the plant.

DESCRIPTION OF THE PREFERRED EMBODIMENTS

The present invention is intended for a steam reforming system utilizing flue gases of a gas turbine. More particularly, the present invention is intended for a system to save the fuel consumption in a feed preheater furnace (or a feed preheater) and a steam reformer (hereinafter referred to simply as a "reformer") by installing a gas turbine generator to generate electric power in a steam reforming system equipped with a pre-reformer, which is used for a plant producing hydrogen, ammonia, methanol, etc. while using hydrocarbons with carbon numbers of $C_2$ or more as feedstocks, and by utilizing flue gases of the gas turbine as a heat source for the feed preheater furnace (or the feed preheater) and a pre-reforming stage. Preferred embodiments of the present invention will be described below with reference to the drawings.

First Embodiment

Figure 1:
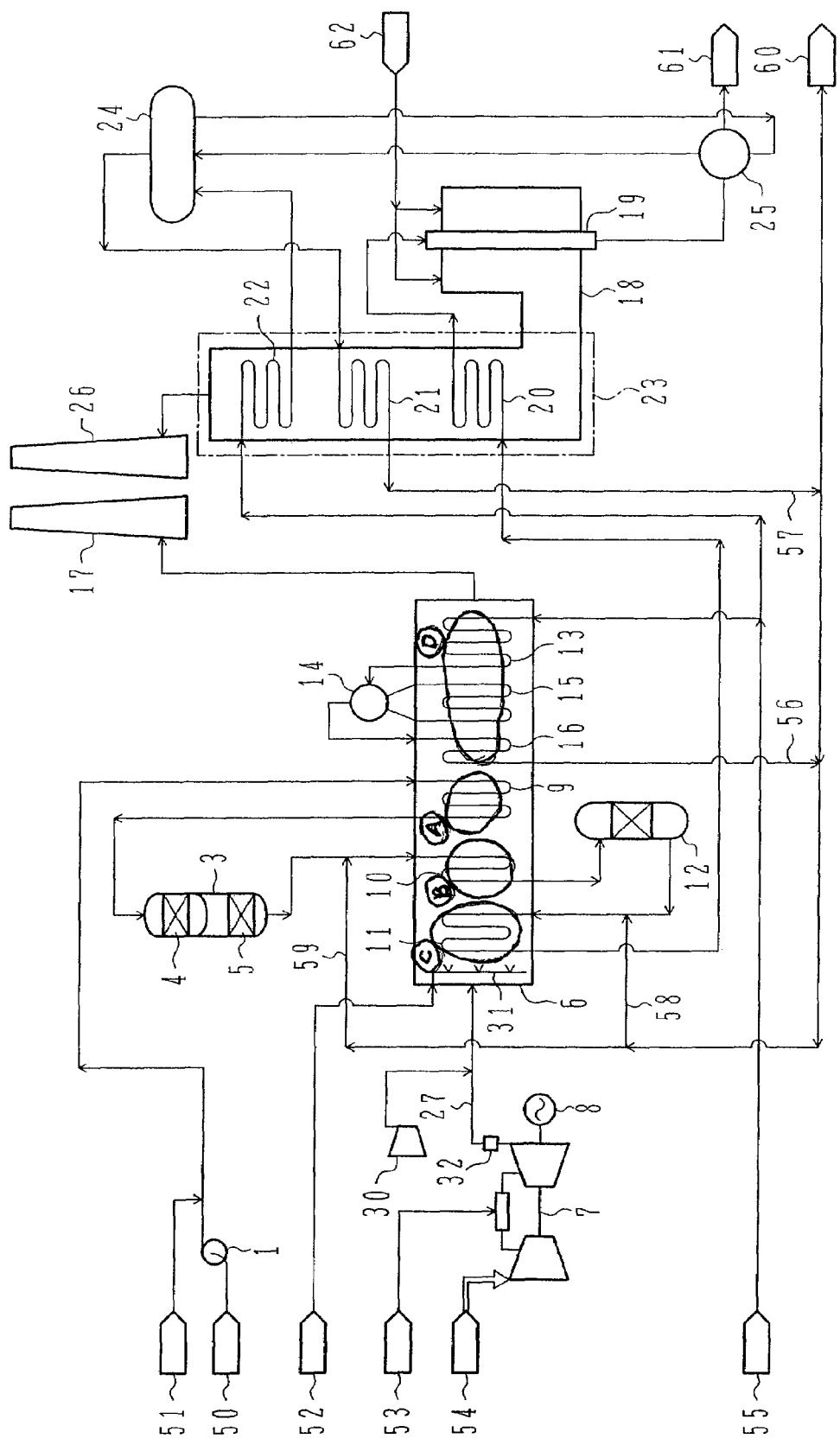
FIG. 1 is a block diagram showing a first embodiment of the present invention.

FIG. 1 shows a first embodiment of the present invention in which a pre-reformer and a gas turbine are additionally installed in combination with a conventional hydrogen production plant using naphtha as feedstocks.

Referring to FIG. 1, fuel 53 and air 54 are supplied to a gas turbine 7 additionally installed in combination with a reformer 18, and a power generator 8 coupled to the gas turbine 7 generates electric power. Gat turbine (GT) flue gases are discharged from a chimney 17 through a GT flue gas duct 27 and a heat recovery exchanger 6. The GT flue gas duct 27 includes a damper 32 and a blower 30.

The heat recovery exchanger 6 comprises heat exchangers, such as an economizer 13, an evaporator 15, a superheater 16, a feed preheater 9 and feed heaters 10, 11, along with a steam drum 14 and an auxiliary burner 31 which is supplied with fuel 52.

In the heat recovery exchanger 6, the feed preheater 9 and the feed heaters 10, 11 perform heat exchange between the GT flue gases and feedstocks supplied to the reformer, thereby heating the feedstocks up to the temperatures required for respective operations of a desulfurization column 3 and a pre-reformer (adiabatic pre-reformer) 12. The GT flue gases leaving the feed preheater 9 are further subjected to heat exchange in the superheater 16, the evaporator 15 and the economizer 13. Superheated steam 56 is generated through the heat exchange performed in the superheater 16. After being added, as required, with superheated steam 57 generated from a reformer's convection section 23, the steam 56 is separated into steam 59 required for a pre-reforming stage and steam 58 required for a reforming stage. The steam 59 and the steam 56 are mixed to the feed gases and the pre-reformed gas upstream of the feed heaters 10 and 11, respectively. In the event of unexpected stop of the gas turbine, the damper 32 is closed and the blower 30 and the auxiliary burner 31 are started so that the pre-reformer 12 and the reformer 18 can continue the operations. Additionally, during the operation of the gas turbine, the auxiliary burner 31 may be operated for burning to adjust the gas temperatures in various sections of the heat recovery exchanger 6 depending on the respective temperatures to which the feedstocks are to be preheated in those sections.

Naphtha 50 as feedstocks supplied to the reformer is pressurized by a feed pump 1 to a level of required pressure, and then supplied to the feed preheater 9 after being added with recycle hydrogen 51. The feedstocks are vaporized and superheated in the feed preheater 9 up to the temperature required for desulfurization of the feedstocks, e.g., 380° C., and are introduced to the desulfurization column 3. Sulfur contained in the feedstocks is converted to hydrogen sulfide by a hydrodesulfurizer 4 in the desulfurization column 3, and the hydrogen sulfide is adsorbed and removed by a sulfur absorber 5 disposed downstream of the desulfurization column 3. Sulfur in the feedstocks must be substantially completely removed because the sulfur acts as poisoning to a pre-reforming catalyst. The feedstocks, from which sulfur has been removed, are mixed with the steam 59 in amount required for the pre-reforming stage. Then, the feedstocks are subjected to heat exchange in the feed heater 10 with the high-temperature flue gases of the gas turbine for heating up to the temperature required for the pre-reforming stage, e.g., 475° C., followed by being introduced to the pre-reformer 12. In the pre-reformer 12, the feedstock naphtha is all converted by the pre-reforming catalyst to a gas mixture of methane, hydrogen, carbon monoxide, and carbon dioxide.

The pre-reformed gas made up of primarily methane is mixed with the steam 58 in amount required for the reforming stage and is heated by the feed heater 11. Subsequently, the pre-reformed gas is further heated up to 550-600° C. by a feed heater 20 in the convection section 23 of the reformer 18, and is then introduced to a reformer tube 19 of the reformer 18 for conversion to synthesis gases at 800-850° C. by the heat of reformer combustions gases. When naphtha is not pre-reformed, the temperature at an inlet of the reformer tube is limited to, e.g., 500° C. or below to avoid carbon formation at the inlet of the reformer tube. In the case using the pre-reformed gas made up of primarily methane, however, the pre-reformed gas can be heated up to 550-600° C. without a fear of the carbon formation. The steam reforming reaction of hydrocarbons is an endothermic reaction occurred under high temperatures. In the reformer, fuel is burnt and resulting combustion heat is utilized as (1) heat for raising the feed temperature up to a level suitable for the reaction, and (2) reaction heat. If the temperature of the feed introduced to the reformer is increased, the amount of the heat mentioned in above (1) is reduced and the fuel consumption in the reformer can be cut correspondingly. With this embodiment, since the waste heat of the gas turbine is utilized for raising the temperature of the feed introduced to the reformer without being directly introduced to the reformer 18, the need of laying the GT flue gas duct subjected to high temperatures over a long distance is eliminated and a high degree of freedom in layout plan is ensured. The synthetic gases leaving the reformer tube at about 800-850° C. are cooled down to the temperature required for a high-temperature CO denaturalizer in a succeeding stage, e.g., about 450-300° C., by generating steam in a heat recovery steam generator 25, and are then sent to the succeeding stage.

The operation of this embodiment will be described below.

For example, in a conventional plant for producing 1.5 millions $Nm^3/d$ of hydrogen by using naphtha as feedstocks, preheating of the feedstocks is performed in an independent feed preheater furnace, and the preheating duty is about $4.7 \times 10^6$ kcal/h on condition that the feedstocks are heated up to the temperature required for desulfurization, e.g., 380° C. Also, the heat duty of the feed heater 20 in the reformer's convection section 23 is about $10.0 \times 10^6$ kcal/h on condition that the feedstocks are heated up to, e.g., 500° C. at the inlet of the reformer tube 19. On condition that the S/C ratio is, e.g., 5.0, the heat duty required for the reforming stage in the reformer 18 is about $59.0 \times 10^6$ kcal/h and the amount of required steam is about 101 t/h. Further, assuming, for example, that medium-pressure steam having pressure of 36.5 MPa and temperature of 330° C. is employed and the temperature of the synthesis gases at an outlet of the heat recovery steam generator 25 is 380° C., the amount of steam generated in the reformer's convection section 23 and the heat recovery steam generator 25 is about 114 t/h. Accordingly, the amount of steam available for supply to the exterior is about 13 t/h.

When the pre-reformer 12, the gas turbine 7, the power generator 8 generating electric power of about 29 MW, and the heat recovery exchanger 6 are additionally installed in the above-described conventional hydrogen production plant as shown in FIG. 1, the following advantages are obtained. Because the feedstock naphtha 50 is converted by the pre-reformer 12 to gases made up of primarily methane, it is here assumed that the temperature at the inlet of the reformer tube 19 is increased up to, e.g., 600° C. When the feedstock naphtha is reformed so as to produce hydrogen in the same amount as in the above-described conventional plant, the heat duty of the reformer 18 is about $53.7 \times 10^6$ kcal/h, namely it is reduced about 9% from the heat duty in the conventional plant, because of the increased temperature at the inlet of the reformer tube. The fuel consumption in the reformer can be saved correspondingly. With regards to the amount of required steam, although the steam consumption in the pre-reformer is generated as an additive factor, the total steam consumption in the overall system is 101 t/h, i.e., the same as that in the conventional plant, because the S/C ratio in the reformer is reduced to about 4.5 as a result of the addition of the pre-reforming stage.

Another advantage is that since the power generator 8 coupled to the gas turbine 7 generates electric power of about 29 MW, the electric power required in the plant can be supplied from the power generator 8 in an independent way, and surplus power can be sold to exterior consumers, which contributes to improving a balance sheet.

The naphtha pressurized by the feed pump 1 to a level of required pressure, e.g., 30 MPa, enters the feed preheater 9 at the ordinary temperature and is heated up to the temperature required for desulfurization, e.g., 380° C. Accordingly, the feed preheater furnace in the conventional plant is no longer required, and the fuel consumed in the feed preheater furnace can be all saved. The feedstocks having been desulfurized in the desulfurization column 3 are mixed with the steam 59 for the pre-reforming stage in amount of, e.g., 32.2 t/h corresponding to the S/C ratio of 1.6, and are then heated by the feed heater 10 up to the temperature required for the pre-reforming stage, e.g., about 475° C. The feedstocks having been heated by the feed heater 10 are converted by the pre-reformer 12 to gases made up of primarily methane, followed by being mixed with the steam 58 in amount of about 69.2 t/h required for the reforming stage. The premixed feed having been mixed with the steam 58 is introduced to the feed heater 11 for heating up to about 478° C., and is then supplied to the reformer's convection section 23. The premixed feed is further heated in the feed heater 20 up to, e.g., about 600° C. by the reformer combustion gases and is introduced to the reformer tube 19. Respective load ratios of the feed heater 11 and the feed heater 20 are optimized in accordance with the characteristics of an actual plant. Additionally, fuel 62 is supplied to and burnt in the reformer 18 to generate the reformer combustion gases at high temperatures, thereby supplying heat for the reforming stage. After providing the heat for the reforming stage, the reformer combustion gases enter the reformer's convection section 23 for recovery of waste heat, followed by being discharged from a chimney 26.

On the other hand, the flue gases leaving the gas turbine 7 are introduced at, e.g., about 570° C. to the heat recovery exchanger 6 in which the temperature of the flue gases gradually lowers through successive heat exchanges with the feed gases. However, the flue gases still have a sufficient amount of heat, i.e., a temperature of about 440° C., at a point after passing the feed preheater 9. Accordingly, the flue gases enter a heat recovery steam generator for recovery of the heat thereof through the superheater 16, the evaporator 15 and the economizer 13. The flue gases have a temperature of, e.g., about 215° C. at an outlet of the heat recovery steam generator, and is then discharged from the chimney 17.

Feedwater 55 having entered at a temperature of, e.g., 125° C. an inlet of the heat recovery steam generator on the heating start side is heated by the economizer 13 up to a temperature of, e.g., about 245° C., and becomes saturated steam at a temperature of, e.g., about 245° C. in the evaporator 15. Also, a part of the feedwater 55 is branched for supply to an economizer 22 in the reformer's convection section 23, and is heated by the waste heat of the reformer 18. The feedwater having been heated by the economizer 22 is supplied to the heat recovery steam generator 25 through a steam drum 24. The heat recovery steam generator 25 recovers the waste heat of high-temperature synthesis gases 61 having been reformed in the reformer 18, and generates steam. The generated steam is supplied to the steam drum 24 in which the feedwater and the steam are separated from each other. The separated steam is superheated by the superheater 21 so as to become the superheated steam 57. The saturated steam generated in the evaporator 15 of the heat recovery exchanger 6 is superheated by the superheater 16 up to, e.g., 330° C. and is used as the steam for the reforming stage together with the steam 57 generated in the reformer's convection section 23. The heat recovery exchanger 6 generates the steam in amount of about 32.6 t/h that substantially corresponds to the amount of heat required for the pre-reforming stage. On the other hand, the amount of the steam generated in the reformer's convection section 23 and the heat recovery steam generator 25 is slightly reduced, i.e., about 110 t/h, in comparison with that in the conventional plant because of a reduction in the amount of the reformer combustion gases. However, since the amount of steam required for the reforming stage is about 101 t/h, this embodiment can provide an advantage that the steam in amount of 41.6 t/h, i.e., about 29 t/h more than that in the conventional plant, is available for supply to the exterior.

According to this embodiment, since the high-temperature flue gases of the gas turbine are not directly supplied to the reformer, the fuel consumption can be saved without reducing the radiant heat absorption efficiency of the reformer and without increasing the reformer size. Another advantage is that since there is no need of laying the flue gas duct subjected to high temperatures over a long distance, the gas turbine is not always required to be installed near the reformer and a high degree of freedom in planning of the plant layout is ensured.

Further, if the fuel consumption in the reformer is saved by installing only the pre-reformer, the amount of steam generated in the reformer's convection section is reduced. In contrast, this embodiment is able to not only compensate for such a reduction in the amount of steam generated in the reformer's convection section, but also to supply the electric power required in the plant with the independent generation of electric power within the plant. Further advantages are that the fuel consumption in both the preheater and the reformer can be saved, and depending on the size of the gas turbine installed, it is possible to supply surplus steam and electric power to the exterior. A still further advantage is that, unlike the case of directly introducing the flue gases of the gas turbine to the reformer, this embodiment makes the capacity of the gas turbine selectable from a wider range with respect to the capacity of the reformer.

Second Embodiment

A second embodiment of the present invention will be described below with reference to FIG. 2. Note that a description of components common to those in the first embodiment is omitted here.

Figure 2:
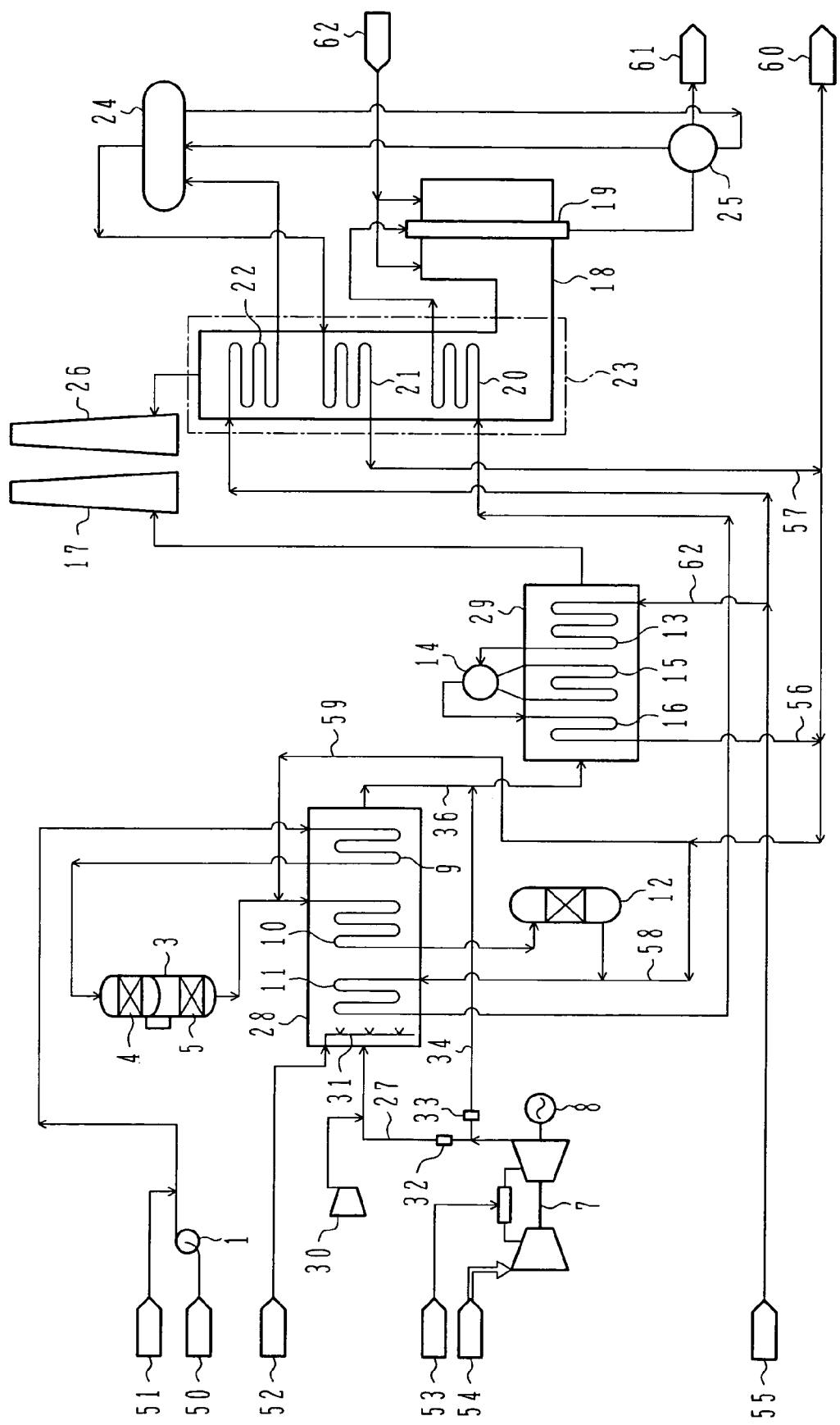
FIG. 2 is a block diagram showing a second embodiment of the present invention.

In this second embodiment, as shown in FIG. 2, the heat recovery exchanger 6 in the first embodiment is installed while it is divided into a first heat recovery exchanger 28 and a heat recovery steam generator 29 serving as a second heat recovery exchanger. The heat recovery exchanger 28 is used to preheat and heat the feedstocks, and the heat recovery steam generator 29 is used to generate steam. The flue gases of the gas turbine is distributed depending on the heat capacity of the heat recovery exchanger 28 by the damper 32 disposed in the GT flue gas duct 27 and a damper 33 disposed in a GT flue gas duct 34. The GT flue gas duct 27 branched to be extended to the heat recovery exchanger 28 includes the blower 30, and the heat recovery exchanger 28 includes the auxiliary burner 31. The GT flue gas duct 34 installed as a route bypassing the heat recovery exchanger 28 serves to introduce the flue gases to some midpoint of a GT flue gas duct 36 through which the flue gases having passed the heat recovery exchanger 28 is supplied to the heat recovery steam generator 29.

This second embodiment can provide the following advantages in addition to the above-described advantages of the first embodiment.

In the second embodiment, during ordinary operation, about 60% of the flue gases of the gas turbine is sent to the heat recovery exchanger 28 through the first GT flue gas duct 27, and after recovery of the waste heat, the flue gases are introduced to the heat recovery steam generator 29 through the second GT flue gas duct 36 connecting an outlet of the heat recovery exchanger 28 and an inlet of the heat recovery steam generator 29 to each other. Remaining 40% of the flue gases of the gas turbine flow through the third GT flue gas duct 34 bypassing the heat recovery exchanger 28 and merge with the flue gases flowing through the second GT flue gas duct 36 after having passed the heat recovery exchanger 28, followed by being introduced to the heat recovery steam generator 29. Because the stages of preheating and heating the feedstocks require thermal value of the flue gases of the gas turbine at a relatively high temperature level, the temperature of the flue gases leaving the heat recovery exchanger 28 is sufficiently high, e.g., about 350° C. To effectively recover the thermal value retained by the flue gases leaving the heat recovery exchanger 28, those flue gases are introduced to the heat recovery steam generator 29 after being merged with the remaining 40% of the flue gases of the gas turbine. As a result, the heat recovery steam generator 29 generates steam in the same amount, i.e., 32.6 t/h, as that in the first embodiment.

Further, if unexpected stop of the gas turbine occurs in the second embodiment, the blower 30 and the auxiliary burner 31 are emergently started, and the dampers 32, 33 for adjusting flow rates of the flue gases are closed. In match with the capacity of the heat recovery exchanger 28, the capacity of each of the blower 30 and the auxiliary burner 31 is just required to be 60% of that in the first embodiment while the steam for the pre-reforming stage is introduced in small amount from the exterior. This results in an advantage that, in the event of unexpected stop of the gas turbine, the operation of the reformer 18 can be continued through the pre-reformer 12 at smaller plant cost and operation cost than those required in the first embodiment. Another advantage is that the capacity of the gas turbine can be made selectable from a wider range with respect to the capacity of the reformer.

Third Embodiment

Figure 3:
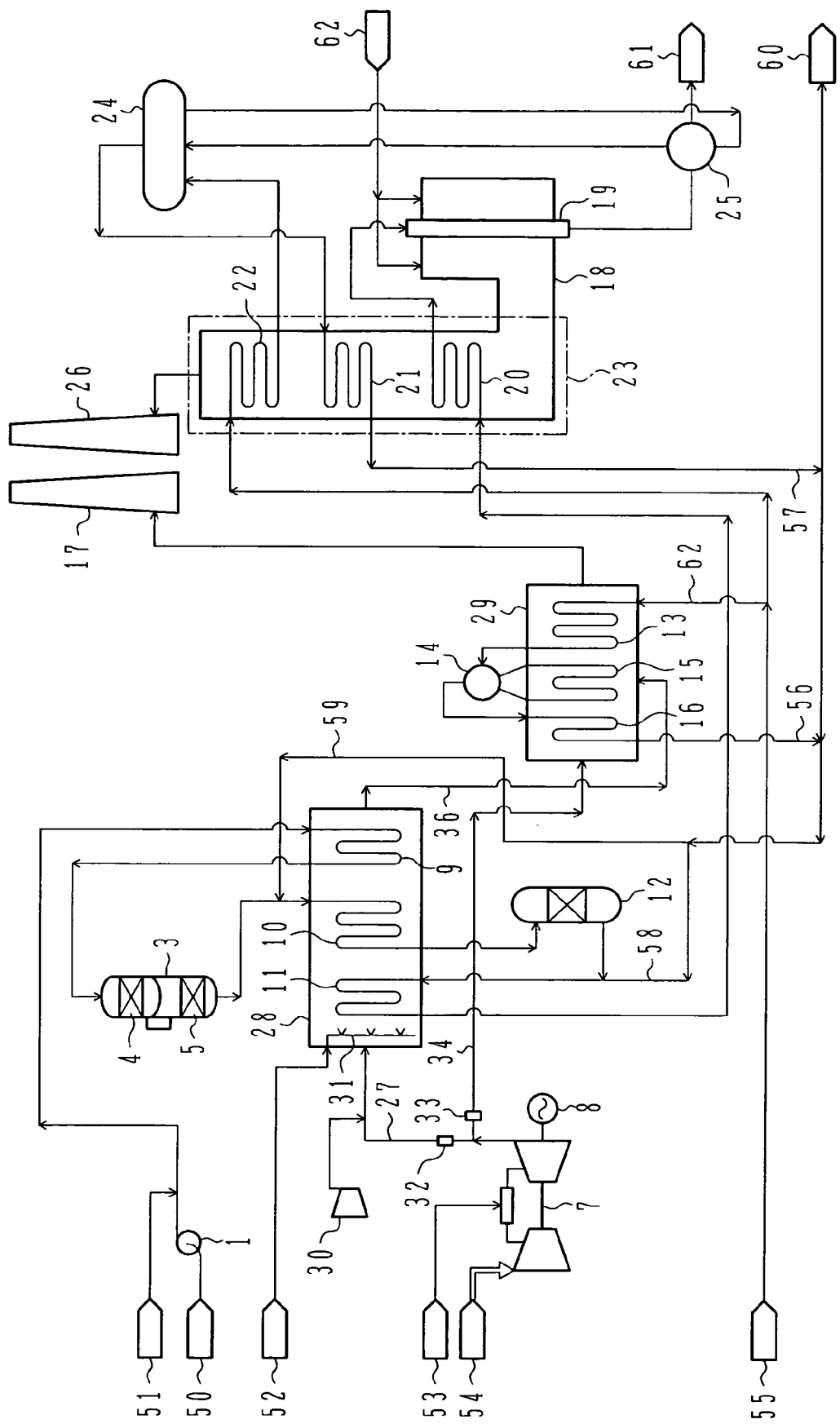
FIG. 3 is a block diagram showing a third embodiment of the present invention.

A third embodiment of the present invention will be described below with reference to FIG. 3. Note that a description of components common to those in the first and second embodiments is omitted here.

In this third embodiment, the high-temperature flue gases of the gas turbine, which has bypassed the heat recovery exchanger 28, is directly introduced to the heat recovery steam generator 29, whereas the flue gases having passed the heat recovery exchanger 28 is introduced to the heat recovery steam generator 29 in its section (intermediate section) where the flue gases directly supplied from the gas turbine flow at temperature close to that of the flue gases introduced from the heat recovery exchanger 28. Stated another way, the second GT flue gas duct 36 connects the outlet of the heat recovery exchanger 28 to the intermediate section of a flue gas path in the heat recovery steam generator 29, and the third GT flue gas duct 34 connects an outlet of the gas turbine 7 (or some midpoint of the first GT flue gas duct 27) to the inlet of the heat recovery steam generator 29, thereby constituting routes for the flue gases.

This third embodiment can provide the following advantages in addition to the above-described advantages of the first and second embodiments.

In the third embodiment, the high-temperature flue gases of the gas turbine, which have bypassed the heat recovery exchanger 28, and the relatively low-temperature the flue gases of the heat recovery exchanger 28 are not merged with each other in the GT flue gas duct 36 extending from the heat recovery exchanger 28, but they are introduced to the heat recovery steam generator 29 in its sections depending on the respective temperatures of both the flue gases. In this embodiment shown in FIG. 3, the flue gases having passed the heat recovery exchanger 28 are merged with the flue gases of the gas turbine, which are supplied through the GT flue gas duct 34, at a position halfway the evaporator 15 in the heat recovery steam generator 29. A flue gases merging point in the heat recovery steam generator 29 is not limited to the point shown in FIG. 3, but it may be optionally selected to some midpoint of the flue gas path in the heat recovery steam generator 29 corresponding to a position where, after the waste heat of the high-temperature flue gases (at, e.g., 570° C.) supplied in a bypassing way through the GT flue gas duct 34 has been recovered in the heat recovery steam generator 29, those flue gases flow at temperature comparable to or differing a predetermined value from that (e.g., 385° C.) of the flue gases introduced from the heat recovery exchanger 28. This embodiment can provide an additional advantage in avoiding a problem such as deformations of the duct, which are possibly caused by thermal stresses when the two types of the flue gases have a large temperature difference therebetween, without changing the amount of steam to be generated.

Fourth Embodiment

Figure 4:
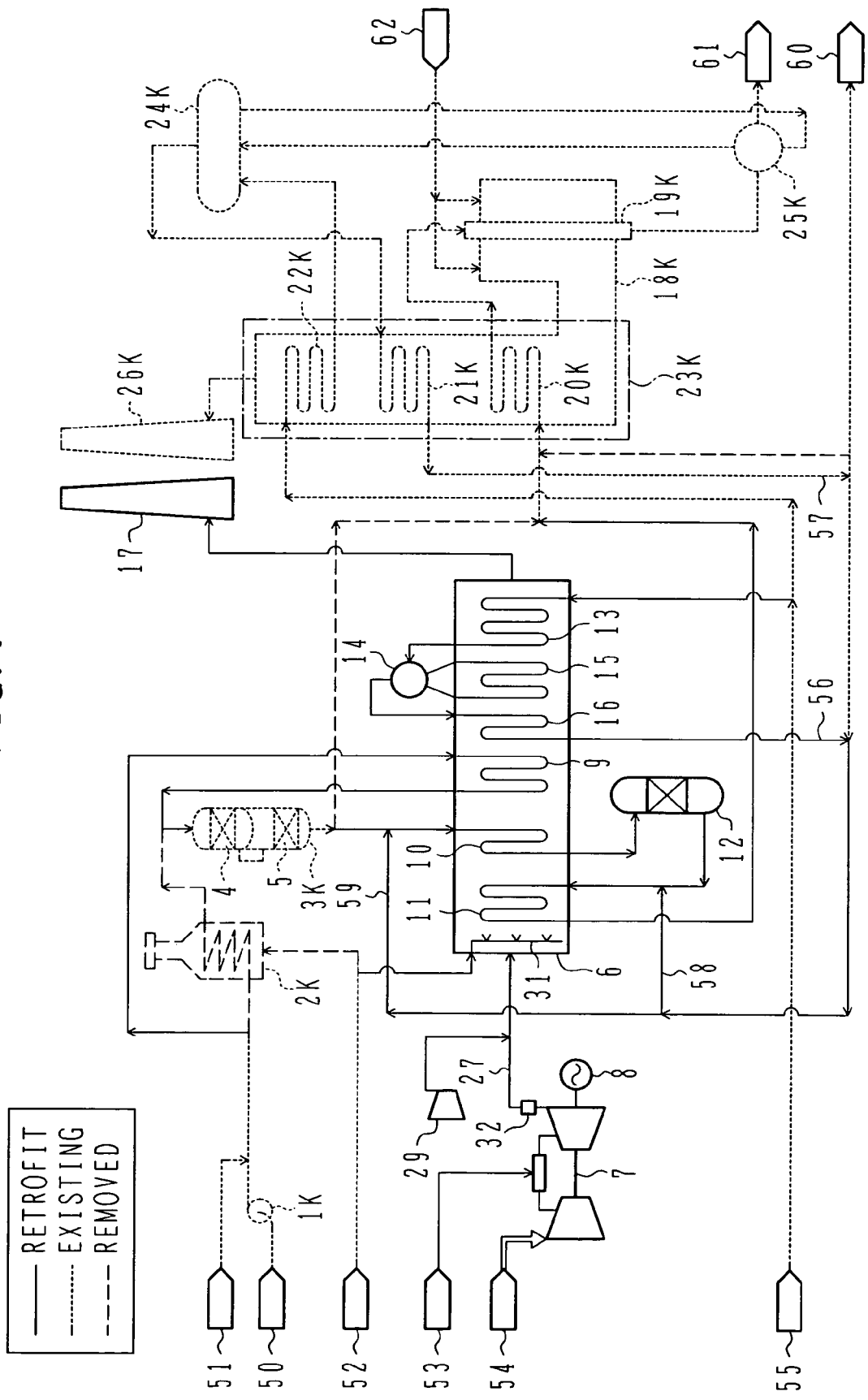
FIG. 4 is a block diagram showing a fourth embodiment of the present invention.

A fourth embodiment of the present invention will be described below with reference to FIG. 4. Note that a description of components common to those in the first, second and third embodiments is omitted here.

This fourth embodiment represents the case in which the gas turbine 7, the power generator 8, the heat recovery exchanger 6, and the pre-reformer 12 are retrofitted to an existing steam reforming system. The existing steam reforming system comprises a feed pump 1K, a feed preheater furnace 2K, a desulfurization column 3K, a reformer 18K, a steam drum 24K, a heat recovery steam generator 25K, and a chimney 26K. The reformer 18K comprises a radiant section including a reformer tube 19K, and a convection section 23K including a feed heater 20K, a superheater 21K and an economizer 22K.

This fourth embodiment has the following advantages.

Since the gas turbine 7 and the heat recovery exchanger 6 are retrofitted to the existing steam reforming system, preheating of the feedstocks for the desulfurization process is performed by the feed preheater 9, thus resulting in an advantage that the existing feed preheater furnace 2K is no longer required and the fuel consumption of $4.7 \times 10^6$ kcal/h in the existing feed preheater furnace 2K can be all saved. While FIG. 4 shows an example in which the existing feed preheater furnace 2K is removed in place of retrofitting the gas turbine 7 and the heat recovery exchanger 6, the existing feed preheater furnace 2K may be left such that the feedstocks are preheated by both the existing feed preheater furnace 2K and the feed preheater 9 in the heat recovery exchanger 6.

When a pre-reforming system is applied to the existing reformer, at least a part of the existing reformer's convection section must be modified to additionally install a feed preheating coil, and the amount of steam recovered from the existing reformer is reduced. With this fourth embodiment, however, the feed heater 11 can be designed such that the feed can be heated up to, e.g., 600° C. at an outlet of the existing feed heater 20K without modifying the existing feed heater 20K. This results in an advantage that, although the existing steam reforming catalyst must be replaced, the pre-reforming system can be applied to the existing reformer with no need of modifying the existing reformer's convection section.

Further, in the case of the S/C ratio being 5 in the reforming stage, the existing reforming system is able to provide steam in amount of about 13 t/h available for supply to the exterior. In contrast, with this embodiment, since the heat recovery exchanger 6 generates steam in amount of 32.6 t/h, the amount of steam available for supply to the exterior can be greatly increased to about 41.6 t/h, and hence an improvement of the overall thermal efficiency is expected with the stop of a part of the existing boilers.

According to the fourth embodiment, unlike the known existing steam reforming system utilizing the flue gases of the gas turbine, the flue gases of the gas turbine are not directly introduced to the existing reformer. Therefore, it is possible to eliminate not only the need of modifying a reformer body, such as an air duct and a burner in the reformer, but also the need of the existing reformer's convection section as described above. This results in an advantage that the modification cost and time of the existing plant can be both cut to a large extent.

Another advantage is that, since the flue gases of the gas turbine is not directly introduced to the existing reformer, there is no limitation in places for installation of newly mounted equipment, such as the gas turbine and the pre-reformer, and the pre-reforming system similarly applicable even to an existing plant not having a sufficient space around an existing reformer.

The second and third embodiments can also be applied to the existing steam reforming system as in the fourth embodiment instead of being applied to a new steam reforming system. The same advantages as those in the second and third embodiments can also be obtained with the case of applying those embodiments to the existing steam reforming system.

What is claimed is:

1. A steam reforming system comprising:
a pre-reformer for producing a pre-reformed gas made primarily of methane from feedstocks having been desulfurized; and
a reformer for converting the pre-reformed gas to synthetic gases made primarily of hydrogen and carbon monoxide,
wherein said steam reforming system further comprises:
a gas turbine; and
a heat recovery exchanger for heating the feedstocks and the pre-reformed gas and generating a steam used for pre-reforming the feedstocks by utilizing waste heat of said gas turbine,
said heat recovery exchanger comprising a first heat exchanger for heating the feedstocks introduced to said pre-reformer by utilizing the waste heat of said gas turbine, a second heat exchanger for heating the pre-reformed gas supplied from said pre-reformer to said reformer, by utilizing the waste heat of said gas turbine, and a third heat exchanger for generating the steam used for pre-reforming the feedstocks in said pre-reformer also by utilizing the waste heat of said gas turbine.

2. A steam reforming system comprising:
a desulfurization column for desulfurizing feedstocks made of hydrocarbons;
a pre-reformer for producing a pre-reformed gas made of primarily methane from feedstocks having been desulfurized; and
a reformer for converting the pre-reformed gas to synthetic gases made of primarily hydrogen and carbon monoxide,
wherein said steam reforming system further comprises:
a gas turbine; and
a heat recovery exchanger for heating the feedstocks and pre-reformed gas and generating a steam used for pre-reforming the feedstocks by utilizing waste heat of said gas turbine,
said heat recovery exchanger comprising a first heat exchanger for heating the feedstocks to be desulfurized in said desulfurization column by utilizing the waste heat of said gas turbine, a second heat exchanger for heating the desulfurized feedstocks to be introduced to said pre-reformer by utilizing the waste heat of said gas turbine, a third heat exchanger for heating the pre-reformed gas supplied from said pre-reformer to said reformer by utilizing the waste heat of said gas turbine, and a fourth heat exchanger for generating the steam used for pre-reforming the feedstocks in said pre-reformer also by utilizing the waste heat of said gas turbine.

3. A steam reforming system according to claim 1 further comprising an auxiliary burner installed in said heat recovery exchanger, and a blower for supplying air to said auxiliary burner.

4. A gas turbine for use in a steam reforming system, wherein waste heat of said gas turbine is utilized as a heat source for heating feedstocks to be pre-reformed and a pre-reformed gas obtained by pre-reforming the feedstocks and supplied to a reformer, and heating feed water for generating steam used for pre-reforming the feedstocks, said steam reforming system comprising a first heat exchanger for heating the feedstocks introduced to a pre-reformer by utilizing the waste heat of said gas turbine, a second heat exchanger for heating the pre-reformed gas supplied from said pre-reformer to said reformer by utilizing the waste heat of said gas turbine, and a third heat exchanger for generating the steam used for pre-reforming the feedstocks in said pre-reformer also by utilizing the waste heat of said gas turbine.

5. A method of modifying an existing steam reforming system comprising:

a feed preheater for preheating feedstocks made of hydrocarbons to be desulfurized;

a desulfurization column for desulfurizing the feedstocks having been preheated by said feed preheater; and a reformer for reforming the feedstocks having been desulfurized, the method comprising the steps of:

retrofitting a gas turbine, a heat recovery exchanger for heating the feedstocks and a pre-reformed gas and generating a steam used for pre-reforming the feedstocks by utilizing waste heat of said gas turbine, and a pre-reformer for producing said pre-reformed gas made of primarily methane from the feedstocks having been desulfurized; and constituting said heat recovery exchanger by a first heat exchanger for heating the feedstocks to be desulfurized in said desulfurization column by utilizing the waste heat of said gas turbine, a second heat exchanger for heating the desulfurized feedstocks to be introduced to said pre-reformer by utilizing the waste heat of said gas turbine, a third heat exchanger for heating the pre-reformed gas supplied from said pre-reformer to said reformer by utilizing the waste heat of said gas turbine, and a fourth heat exchanger for generating the steam used for pre-reforming the feedstocks in said pre-reformer also by utilizing the waste heat of said gas turbine.

6. A method of operating a steam reforming system comprising:

a pre-reformer for producing a pre-reformed gas made of primarily methane from feedstocks having been desulfurized;

a reformer for converting the pre-reformed gas to synthetic gases made of primarily hydrogen and carbon monoxide;

a gas turbine; and a heat recovery exchanger for recovering waste heat from flue gases of said gas turbine, wherein said heat recovery exchanger utilizes waste heat of said gas turbine to heat the feedstocks introduced to said pre-reformer by a first heat exchanger and to heat the pre-reformed gas supplied from said pre-reformer to said reformer by a second heat exchanger, and also utilizes the waste heat of the gas turbine to generate steam used for pre-reforming the feedstocks in said pre-reformer by a third heat exchanger.

7. A method of operating a steam reforming system comprising:

a desulfurization column for desulfurizing feedstocks made of hydrocarbons;

a pre-reformer for producing a pre-reformed gas made of primarily methane from feedstocks having been desulfurized;

a reformer for converting the pre-reformed gas to synthetic gases made of primarily hydrogen and carbon monoxide;

a gas turbine; and a heat recovery exchanger for recovering waste heat from flue gases of said gas turbine, wherein said heat recovery exchanger utilizes the waste heat of said gas turbine to preheat the feedstocks to be desulfurized in said desulfurization column by a first heat exchanger, to heat the feedstocks introduced to said pre-reformer by a second heat exchanger and to heat the pre-reformed gas supplied from said pre-reformer to said reformer by a third heat exchanger, and also utilizes the waste heat of the gas turbine to generate steam used for pre-reforming the feedstocks in said pre-reformer by a fourth heat exchanger.

* * * * *